(12) United States Patent
Yoshida

(10) Patent No.: US 8,630,081 B2
(45) Date of Patent: Jan. 14, 2014

(54) CERAMIC ELECTRONIC COMPONENT

(75) Inventor: Akihiro Yoshida, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 166 days.

(21) Appl. No.: 13/187,612

(22) Filed: Jul. 21, 2011

(65) Prior Publication Data

US 2012/0019978 A1 Jan. 26, 2012

(30) Foreign Application Priority Data

Jul. 21, 2010 (JP) ................................ 2010-164111
Jun. 10, 2011 (JP) ................................ 2011-130033

(51) Int. Cl.
*H01G 4/005* (2006.01)
*H01G 4/06* (2006.01)

(52) U.S. Cl.
USPC .......................................... 361/303; 361/311

(58) Field of Classification Search
USPC ........................................ 361/303, 305, 311
See application file for complete search history.

(56) References Cited

U.S. PATENT DOCUMENTS

| | | | |
|---|---|---|---|
| 2004/0070919 A1 | 4/2004 | Takeuchi et al. | |
| 2006/0158825 A1 | 7/2006 | Hidaka et al. | |

FOREIGN PATENT DOCUMENTS

| | | | |
|---|---|---|---|
| JP | 08-316086 A | | 11/1996 |
| JP | 11-026295 A | | 1/1999 |
| JP | 2000-243647 A | | 9/2000 |
| JP | 2000340448 A | * | 12/2000 |
| JP | 2002-015941 A | | 1/2002 |
| JP | 2002-075780 A | | 3/2002 |
| JP | 2009-212527 A | | 9/2009 |
| WO | 2007/040029 A1 | | 4/2007 |
| WO | 2011/013658 A1 | | 2/2011 |

OTHER PUBLICATIONS

Official Communication issued in corresponding European Patent Application No. 11173113.9, mailed on Oct. 26, 2011.
Yoshida, "Ceramic Electronic Component", U.S. Appl. No. 13/187,607, filed Jul. 21, 2011.
Sato et al., "Ceramic Electronic Component", U.S. Appl. No. 13/187,617, filed Jul. 21, 2011.

* cited by examiner

*Primary Examiner* — Eric Thomas
(74) *Attorney, Agent, or Firm* — Keating & Bennett, LLP

(57) ABSTRACT

A ceramic electronic component includes a plurality of first reinforcement layers. The plurality of first reinforcement layers are arranged in a first outer layer portion so as to extend in the length direction and in the width direction, and are stacked in the thickness direction. The volume proportion of the plurality of first reinforcement layers in a region of the ceramic body in which the plurality of first reinforcement layers are provided is greater than the volume proportion of the first and second internal electrodes in an effective portion.

11 Claims, 10 Drawing Sheets

CERAMIC ELECTRONIC COMPONENT

BACKGROUND OF THE INVENTION

1. Field of the Invention

The present invention relates to a ceramic electronic component.

2. Description of the Related Art

With the recent reduction in the size and thickness of electronic devices, such as mobile phones and portable music players, wiring boards mounted in the electronic devices have become increasingly compact. Accordingly, ceramic electronic components mounted on the wiring boards have also become smaller and thinner.

In the related art, ceramic electronic components having rectangular-parallelepiped ceramic bodies have a relatively high mechanical strength, whereas ceramic electronic components having thin flat ceramic bodies have a relatively low mechanical strength. Furthermore, the mechanical strength of the ceramic electronic components tends to decrease as the thickness of the ceramic bodies decrease. Therefore, it is a problem to increase the mechanical strength of a ceramic electronic component that includes a flat ceramic body.

Examples of a method for increasing the mechanical strength of a ceramic electronic component include a method for forming reinforcement conductor layers (buffer layers) in a ceramic body, as described in Japanese Unexamined Patent Application Publication No. 11-26295.

However, even reinforcement conductor layers provided in a ceramic body may not sufficiently prevent the occurrence of cracks in a ceramic electronic component. Therefore, it is difficult to sufficiently improve the mechanical durability of the ceramic electronic component.

SUMMARY OF THE INVENTION

Accordingly, preferred embodiments of the present invention provide a ceramic electronic component with high mechanical durability.

According to a preferred embodiment of the present invention, a ceramic electronic component preferably includes a ceramic body having a substantially rectangular parallelepiped shape, a first internal electrode, and a second internal electrode. The ceramic body includes a first main surface, a second main surface, a first side surface, a second side surface, a first end surface, and a second end surface. The first main surface and the second main surface extend in a length direction of the ceramic body and in a width direction of the ceramic body. The first side surface and the second side surface extend in the length direction and in a thickness direction of the ceramic body. The first end surface and the second end surface extend in the width direction and in the thickness direction. The first internal electrode and the second internal electrode are provided inside the ceramic body. The first internal electrode and the second internal electrode extend in the length direction and in the width direction. The first internal electrode and the second internal electrode face each other in the thickness direction. The ceramic body includes an effective portion in which the first internal electrode and the second internal electrode face each other in the thickness direction, a first outer layer portion that is located closer to the first main surface than the effective portion, and a second outer layer portion that is located closer to the second main surface than the effective portion. The ceramic electronic component preferably further includes a plurality of first reinforcement layers. The plurality of first reinforcement layers are provided in the first outer layer portion so as to extend in the length direction and in the width direction, and are stacked in the thickness direction. A volume proportion of the plurality of first reinforcement layers in a region of the ceramic body in which the plurality of first reinforcement layers are provided is preferably greater than a volume proportion of the first internal electrode and the second internal electrode in the effective portion.

In the ceramic electronic component, the number of first reinforcement layers may preferably be greater than the total number of first and second internal electrodes.

In the ceramic electronic component, a distance between first reinforcement layers that are adjacent in the thickness direction among the plurality of first reinforcement layers may preferably be less than a distance between the first internal electrode and the second internal electrode that are adjacent in the thickness direction.

In the ceramic electronic component, each of the plurality of first reinforcement layers may preferably have a thickness greater than the first internal electrode or the second internal electrode.

In the ceramic electronic component, each of the plurality of first reinforcement layers may preferably be made of a metal or an alloy, for example. That is, in a preferred embodiment of the present invention, the reinforcement layer may be made of a conductor layer.

The ceramic electronic component may preferably further include a plurality of second reinforcement layers that are provided in the second outer layer portion so as to extend in the length direction and in the width direction and that are stacked in the thickness direction. A volume proportion of the plurality of second reinforcement layers in a region of the ceramic body where the plurality of second reinforcement layers are provided may preferably be greater than a volume proportion of the first internal electrode and the second internal electrode in the effective portion.

According to another preferred embodiment of the present invention, a ceramic electronic component preferably includes a ceramic body having a rectangular parallelepiped, a first internal electrode, and a second internal electrode. The ceramic body includes a first main surface, a second main surface, a first side surface, a second side surface, a first end surface, and a second end surface. The first main surface and the second main surface extend in a length direction of the ceramic body and in a width direction of the ceramic body. The first side surface and the second side surface extend in the length direction and in a thickness direction of the ceramic body. The first end surface and the second end surface extend in the width direction and in the thickness direction. The first internal electrode and the second internal electrode are provided inside the ceramic body. The first internal electrode and the second internal electrode extend in the length direction and in the width direction. The first internal electrode and the second internal electrode face each other in the thickness direction. The ceramic body includes an effective portion where the first internal electrode and the second internal electrode face each other in the thickness direction, a first outer layer portion that is located closer to the first main surface than the effective portion, and a second outer layer portion that is located closer to the second main surface than the effective portion. The ceramic electronic component preferably further includes a plurality of first reinforcement layers. The plurality of first reinforcement layers are provided in the first outer layer portion so as to extend in the length direction and in the width direction, and are stacked in the thickness direction. The number of first reinforcement layers is preferably greater than the total number of first and second internal electrodes.

In the ceramic electronic component, a distance between first reinforcement layers that are adjacent in the thickness direction among the plurality of first reinforcement layers may be smaller than a distance between the first internal electrode and the second internal electrode that are adjacent in the thickness direction.

In the ceramic electronic component, each of the plurality of first reinforcement layers may preferably have a thickness greater than the first internal electrode or the second internal electrode.

In the ceramic electronic component, each of the plurality of first reinforcement layers may preferably be made of a metal or an alloy, for example.

The ceramic electronic component may preferably further include a plurality of second reinforcement layers that are provided in the second outer layer portion so as to extend in the length direction and in the width direction and that are stacked in the thickness direction. The number of second reinforcement layers may preferably be greater than the total number of first and second internal electrodes.

According to a preferred embodiment of the present invention, the volume proportion of a plurality of first reinforcement layers in a region of a ceramic body in which the plurality of first reinforcement layers are provided is greater than the volume proportion of first and second internal electrodes in an effective portion. Alternatively, the number of first reinforcement layers may be greater than the total number of first and second internal electrodes. Therefore, the rigidity of the region of the ceramic body in which the plurality of first reinforcement layers are provided is high, which results in high mechanical durability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A first preferred embodiment of the present invention will be described hereinafter in the context of a ceramic electronic component 1 illustrated in FIG. 1, by way of example. However, the ceramic electronic component 1 is merely illustrative. Preferred embodiments of the present invention are not limited to the ceramic electronic component 1 described below and a method for manufacturing the ceramic electronic component 1.

Figure 1:
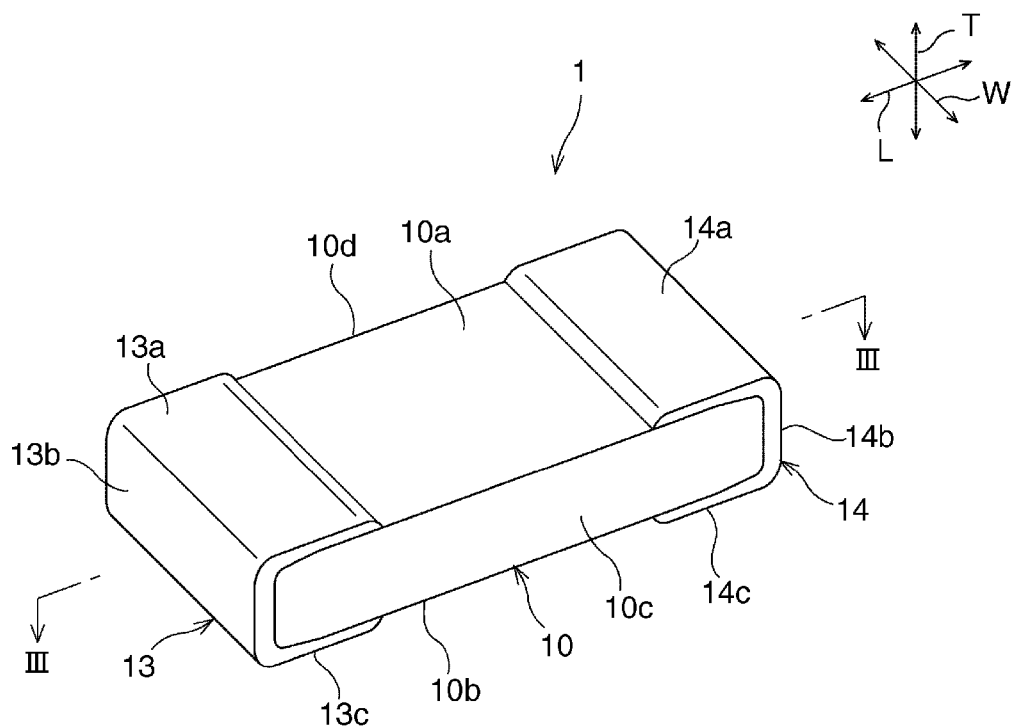
FIG. 1 is schematic perspective view of a ceramic electronic component according to a first preferred embodiment of the present invention.
Figure 2:
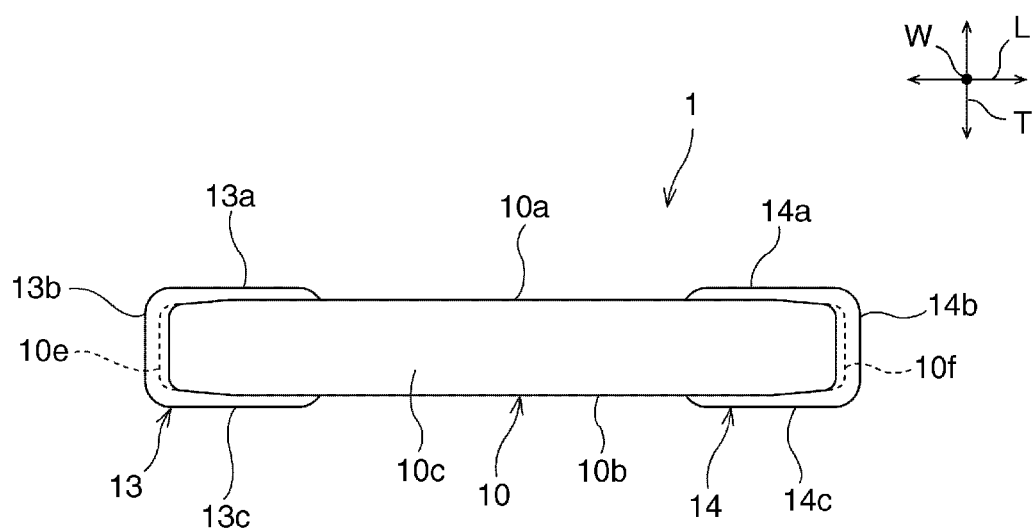
FIG. 2 is a schematic side view of the ceramic electronic component according to the first preferred embodiment of the present invention.
Figure 3:
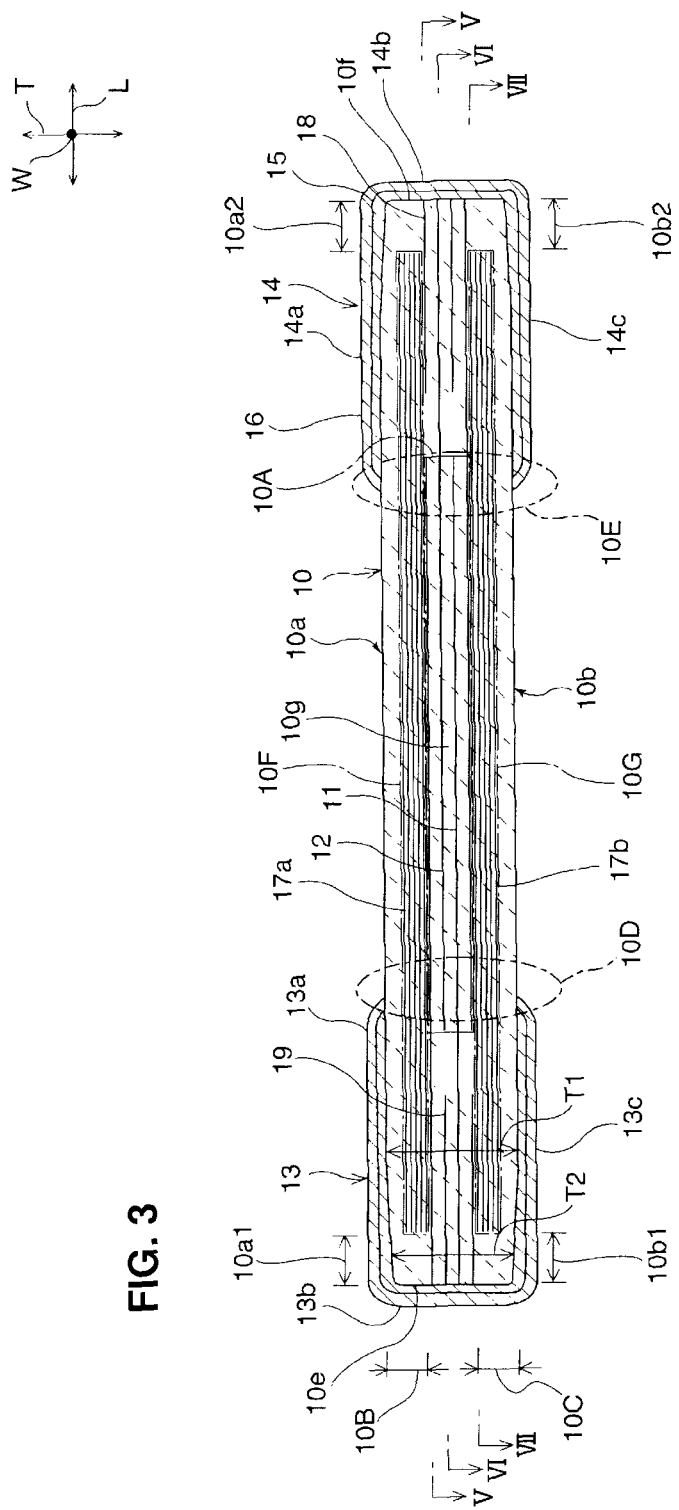
FIG. 3 is a schematic cross-sectional view taken along line III-III in FIG. 1.
Figure 4:
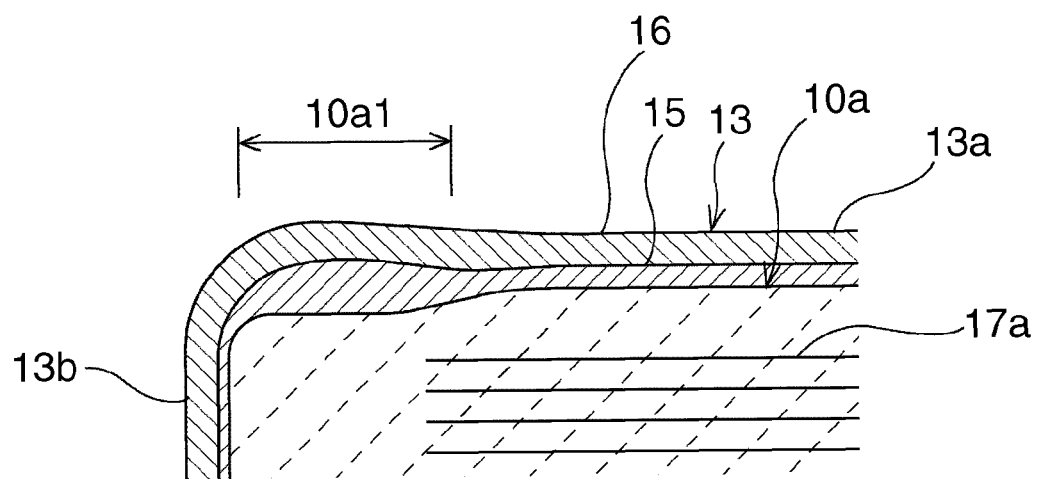
FIG. 4 is a schematic cross-sectional view of an enlarged portion of the ceramic electronic component according to the first preferred embodiment of the present invention.
Figure 5:
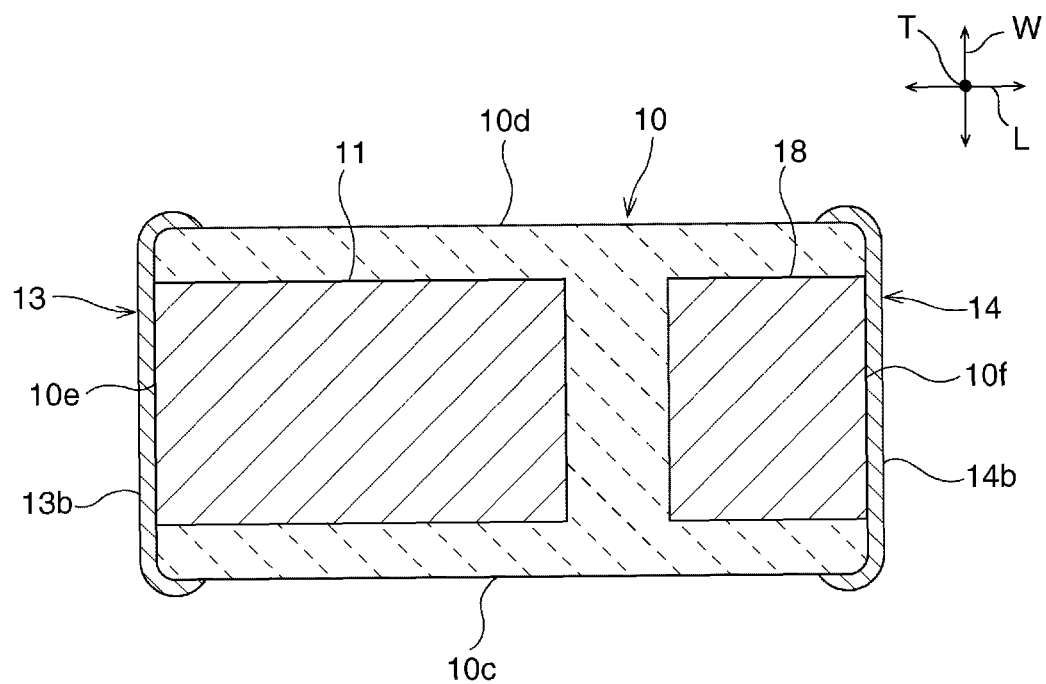
FIG. 5 is a schematic cross-sectional view taken along line V-V in FIG. 3.
Figure 6:
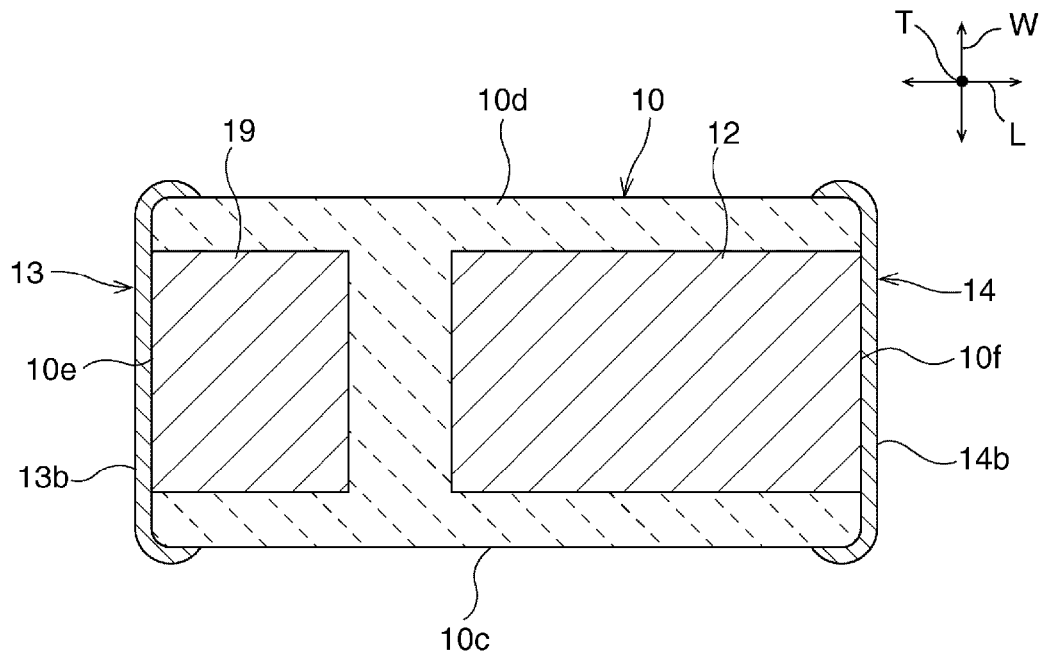
FIG. 6 is a schematic cross-sectional view taken along line VI-VI in FIG. 3.
Figure 7:
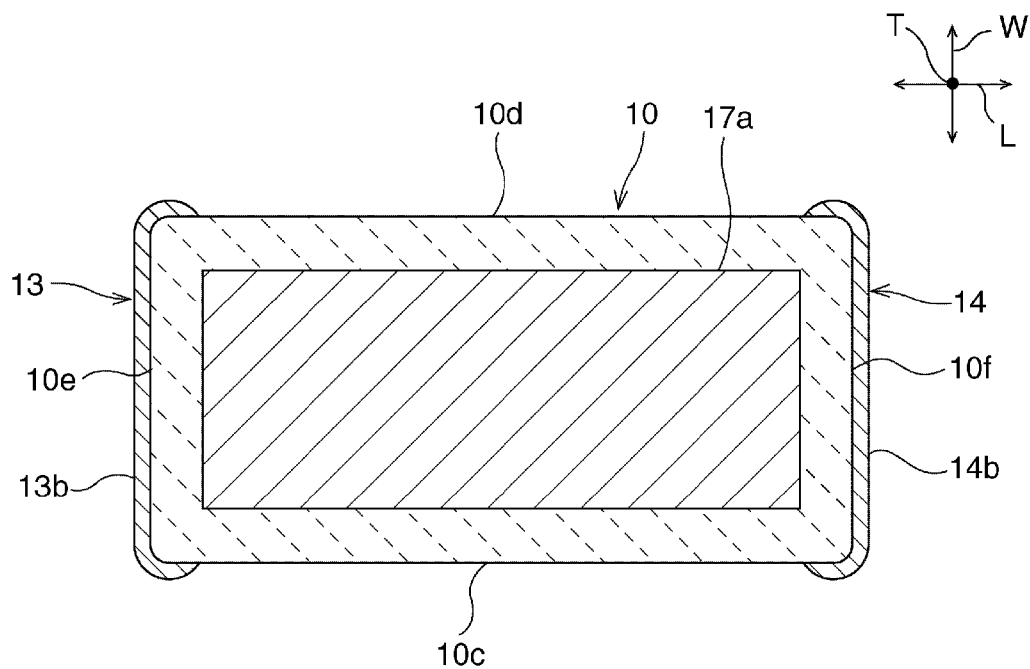
FIG. 7 is a schematic cross-sectional view taken along line VII-VII in FIG. 3.

FIG. 1 is a schematic perspective view of a ceramic electronic component according to a first preferred embodiment of the present invention. FIG. 2 is a schematic side view of the ceramic electronic component according to the first preferred embodiment. FIG. 3 is a schematic cross-sectional view taken along line III-III in FIG. 1. FIG. 4 is a schematic cross-sectional view of an enlarged portion of the ceramic electronic component according to this preferred embodiment. FIG. 5 is a schematic cross-sectional view taken along line V-V in FIG. 3. FIG. 6 is a schematic cross-sectional view taken along line VI-VI in FIG. 3. FIG. 7 is a schematic cross-sectional view taken along line VII-VII in FIG. 3.

First, the configuration of the ceramic electronic component 1 will be described with reference to FIGS. 1 to 7.

As illustrated in FIGS. 1 to 7, the ceramic electronic component 1 includes a ceramic body 10. The ceramic body 10 is made of an appropriate ceramic material in accordance with the functionality of the ceramic electronic component 1. Specifically, when the ceramic electronic component 1 is a capacitor, the ceramic body 10 may preferably be made of a dielectric ceramic material. Specific examples of the dielectric ceramic material include $BaTiO_3$, $CaTiO_3$, $SrTiO_3$, and $CaZrO_3$. The ceramic body 10 may preferably include any of the ceramic materials described above as a main component, and, as sub-components, for example, a Mn compound, a Mg compound, a Si compound, a Fe compound, a Cr compound, a Co compound, a Ni compound, a rare-earth compound, and other suitable sub-components may be optionally added in accordance with the desired characteristics of the ceramic electronic component 1.

When the ceramic electronic component 1 is a ceramic piezoelectric element, the ceramic body 10 may preferably be made of a piezoelectric ceramic material. Specific examples of the piezoelectric ceramic material include lead zirconate titanate (PZT) ceramic materials.

When the ceramic electronic component 1 is a thermistor element, the ceramic body 10 may preferably be made of a semiconductor ceramic material. Specific examples of the semiconductor ceramic material include spinel ceramic materials.

When the ceramic electronic component 1 is an inductor element, the ceramic body 10 may preferably be made of a magnetic ceramic material. Specific examples of the magnetic ceramic material may include ferrite ceramic materials.

In the following description of this preferred embodiment, the ceramic electronic component 1 is a ceramic capacitor, by way of example. More specifically, in this preferred embodiment, by way of example, the ceramic electronic component 1 is a ceramic capacitor having a relatively low capacitance of about 0.1 nF to about 100 nF.

The ceramic body 10 preferably has a substantially rectangular parallelepiped shape. As illustrated in FIGS. 1 to 7, the ceramic body 10 includes a first main surface 10a, a second main surface 10b, a first side surface 10c, a second side surface 10d, a first end surface 10e, and a second end surface 10f. As illustrated in FIGS. 1 to 3, the first and second main surfaces 10a and 10b extend in the length direction L and in the width direction W. As illustrated in FIGS. 1 and 5 to 7, the first and second side surfaces 10c and 10d extend in the thickness direction T and in the length direction L. As illustrated in FIGS. 2 to 7, the first and second end surfaces 10e and 10f extend in the thickness direction T and in the width direction W.

The term "rectangular parallelepiped" or "substantially rectangular parallelepiped", as used herein, includes a rectangular parallelepiped shape with chamfered or R-chamfered corners or edges. That is, the term "rectangular parallelepiped member" or "substantially rectangular parallelepiped member" means a member including first and second main surfaces, first and second side surfaces, and first and second end surfaces. Further, a portion or the entirety of the main surfaces, the side surfaces, and the end surfaces may include irregularities. That is, the main surfaces, the side surfaces, and the end surfaces may not necessarily be flat.

The dimensions of the ceramic body 10 are not particularly limited. However, the ceramic body 10 is preferably thin, satisfying T≤W<L, about ⅕ W≤T≤about ½ W, and T≤about 0.3 mm, where T, L, and W denote the thickness, length, and width of the ceramic body 10, respectively. Specifically, the dimensions of the ceramic body 10 are preferably, about 0.1 mm T≤about 0.3 mm, about 0.4 mm≤L≤about 1 mm, and about 0.2 mm≤W≤about 0.5 mm, for example.

The thickness of a ceramic layer 10g is not particularly limited. The thickness of the ceramic layer 10g may preferably be in the range of, for example, about 0.5 μm to about 10 μm.

As illustrated in FIG. 3, in the ceramic body 10, a plurality of first substantially rectangular internal electrodes 11 and a plurality of second substantially rectangular internal electrodes 12 are alternately arranged at equal or substantially equal intervals in the thickness direction T. Each of the first internal electrodes 11 and the second internal electrodes 12 is substantially parallel to the first main surface 10a and the second main surface 10b.

As illustrated in FIGS. 3 and 5, the first internal electrodes 11 are arranged so as to extend in the length direction L and in the width direction W. The first internal electrodes 11 are exposed from the first end surface 10e of the ceramic body 10, and extend from the first end surface 10e toward the second end surface 10f. The first internal electrodes 11 do not extend to the second end surface 10f, the first side surface 10c, or the second side surface 10d. The second internal electrodes 12 are also arranged so as to extend in the length direction L and in the width direction W. As illustrated in FIGS. 3 and 6, the second internal electrodes 12 are exposed from the second end surface 10f of the ceramic body 10, and extend from the second end surface 10f toward the first end surface 10e. The second internal electrodes 12 do not extend to the first end surface 10e, the first side surface 10c, or the second side surface 10d. The first and second internal electrodes 11 and 12 are arranged at the same or substantially the same position in the width direction W. Thus, the first internal electrodes 11 and the second internal electrodes 12 face each other with the ceramic layer 10g disposed therebetween in a central portion of the ceramic body 10 in the length direction L. In both end portions of the ceramic body 10 in the length direction L, the first internal electrodes 11 and the second internal electrodes 12 do not face each other in the thickness direction T.

A portion of the ceramic body 10 in which the first internal electrodes 11 and the second internal electrodes 12 face each other defines an effective portion 10A that functions as a capacitor. A portion of the ceramic body 10 that is located closer to the first main surface 10a than the effective portion 10A defines a first outer layer portion 10B, and a portion of the ceramic body 10 that is located closer to the second main surface 10b than the effective portion 10A defines a second outer layer portion 10C.

As described above, since the ceramic electronic component 1 is a ceramic capacitor having a relatively low capacitance, the proportion of the effective portion 10A in the ceramic body 10 is relatively small. The length of the effective portion 10A in the thickness direction T is, for example, preferably about 0.1 times to about 0.5 times the maximum length of the ceramic body 10 in the thickness direction T. The length of the effective portion 10A in the length direction L is, for example, preferably about 0.2 times to about 0.7 times the maximum length of the ceramic body 10 in the length direction L.

Further, preferably, for example, one to ten pairs of first and second internal electrodes 11 and 12 (one first internal electrode 11 and one second internal electrode 12, i.e., two internal electrodes in total, to ten first internal electrodes 11 and ten second internal electrodes 12, i.e., twenty internal electrodes in total) are provided.

Furthermore, as in this preferred embodiment, in a ceramic capacitor having a relatively low capacitance, the distance between first and second internal electrodes may preferably be equal to two to eight ceramic layers 10g, for example.

The ceramic body 10 also preferably includes first and second dummy electrodes 18 and 19. The first dummy electrodes 18 are provided at the same position as the first internal electrodes 11 in the thickness direction T so as to face the first internal electrodes 11 at intervals in the length direction L. Thus, the same number of first dummy electrodes 18 as the number of first internal electrodes 11 is preferably provided. The second dummy electrodes 19 are provided at the same position as the second internal electrodes 12 in the thickness direction T so as to face the second internal electrodes 12 at intervals in the length direction L. Thus, the same number of second dummy electrodes 19 as the number of second internal electrodes 12 is provided. The first and second dummy electrodes 18 and 19 do not substantially contribute to the production of electrical characteristics of the ceramic electronic component 1.

The material of the first and second internal electrodes 11 and 12 and the material of the first and second dummy electrodes 18 and 19 are not particularly limited. Each of the first and second internal electrodes 11 and 12 and the first and second dummy electrodes 18 and 19 may preferably be made of, for example, a metal such as Ni, Cu, Ag, Pd, or Au or an alloy containing at least one of the above metals, such as an Ag—Pd alloy. The first and second internal electrodes 11 and 12 may be made of the same material as or a different material from the first and second dummy electrodes 18 and 19.

Further, the thickness of the first and second internal electrodes 11 and 12 and the thickness of the first and second dummy electrodes 18 and 19 are not particularly limited. The thickness of each of the first and second internal electrodes 11 and 12 and the first and second dummy electrodes 18 and 19 may preferably be, for example, about 0.3 µm to about 2 µm. The thickness of the first and second internal electrodes 11 and 12 is preferably the same as the thickness of the first and second dummy electrodes 18 and 19.

As illustrated in FIGS. 1 to 3, a first external electrode 13 and a second external electrode 14 are provided on surfaces of the ceramic body 10. The first external electrode 13 is electrically connected to the first internal electrodes 11. The first external electrode 13 preferably includes a first portion 13a provided on the first main surface 10a, a third portion 13c provided on the second main surface 10b, and a second portion 13b provided on the first end surface 10e. In this preferred embodiment, the first external electrode 13 is arranged so as to be shallowly wrapped around end portions of the first and second side surfaces 10c and 10d in the length direction L. Specifically, the length of the portions of the first external electrode 13 on the first and second side surfaces 10c and 10d in the length direction L is preferably less than substantially half the length of the first and third portions 13a and 13c in the length direction L. The length of the first and third portions 13a and 13c in the length direction L is preferably, for example, about 200 µm to about 350 µm. The first external electrode 13 does not substantially project from the first side surface 10c or the second side surface 10d in the width direction W. With this configuration, the dimension of the ceramic electronic component in the width direction W is reduced. The first external electrode 13 may not necessarily be provided substantially on the first side surface 10c or the second side surface 10d.

The second external electrode 14 is electrically connected to the second internal electrodes 12. The second external electrode 14 includes a first portion 14a provided on the first main surface 10a, a third portion 14c provided on the second main surface 10b, and a second portion 14b provided on the second end surface 10f. In this preferred embodiment, the second external electrode 14 is arranged so as to be shallowly wrapped around end portions of the first and second side surfaces 10c and 10d in the length direction L. Specifically, the length of the portions of the second external electrode 14 on the first and second side surfaces 10c and 10d in the length direction L is preferably less than substantially half the length of the first and third portions 14a and 14c in the length direction L. The length of the first and third portions 14a and 14c in the length direction L is preferably, for example, about 200 µm to about 350 µm. The second external electrode 14 does not substantially project from the first side surface 10c or the second side surface 10d in the width direction W. With this configuration, the dimension of the ceramic electronic component 1 in the width direction W is reduced. The second external electrode 14 may not necessarily be arranged substantially on the first side surface 10c or the second side surface 10d.

The maximum thickness of each of the first and second external electrodes 13 and 14 may preferably range from, for example, about 10 µm to about 50 µm.

Next, the configuration of the first and second external electrodes 13 and 14 will be described with reference to FIG. 3. In this preferred embodiment, each of the first and second external electrodes 13 and 14 includes a laminate of a first conductor layer 15 and a second conductor layer 16.

The first conductor layer 15 is provided on the first end surface 10e or the second end surface 10f and on an end of the first main surface 10a or the second main surface 10b in the length direction L.

Outer end portions of portions of the first conductor layers 15 of the first and second external electrodes 13 and 14, which respectively define the first portions 13a and 14a, in the length direction L are preferably relatively thick. Similarly, outer end portions of portions of the first conductor layers 15 of the first and second external electrodes 13 and 14, which respectively define the third portions 13c and 14c, in the length direction L are preferably relatively thick. Specifically, in portions of the first conductor layers 15 of the first and second external electrodes 13 and 14, which respectively define the first portions 13a and 14a, portions that do not face first reinforcement layers 17a are thicker than portions that face the first reinforcement layers 17a. Similarly, in portions of the first conductor layers 15 of the first and second external electrodes 13 and 14, which respectively define the third portion 13c and 14c, portions that do not face second reinforcement layers 17b are thicker than portions that face the second reinforcement layers 17b. Therefore, in each of the first and third portions 13a and 14a and 13c and 14c of the first and second external electrodes 13 and 14, a portion that does not face the first reinforcement layers 17a or the second reinforcement layers 17b is thicker than a portion that faces the first reinforcement layers 17a or the second reinforcement layers 17b. For example, the thickness of the outer end portion of the first conductor layer 15 may preferably be maximally in the range from about 5 µm to about 20 µm, whereas the thickness of an inner end portion of the first conductor layer 15 may preferably be maximally in the range from about 1 µm to about 10 µm.

A portion of the first conductor layer 15 that is provided on the first end surface 10e or the second end surface 10f is preferably thinner than a portion of the first conductor layer 15 that is provided on the first main surface 10a or the second main surface 10b. A portion of the second conductor layer 16 that is provided on the first end surface 10e or the second end surface 10f is preferably thinner than a portion of the second conductor layer 16 that is provided on the first end surface 10e or the second end surface 10f. For example, the thickness of a portion of each of the conductor layers 15 and 16 that is provided on the first end surface 10e or the second end surface 10f may preferably be maximally in the range from about 3 µm to about 10 µm.

The material of the first conductor layer 15 is not particularly limited. The first conductor layer 15 may preferably be made of a metal such as Ni, Cu, Ag, Pd, or Au or an alloy containing at least one of the above metals, such as an Ag—Pd alloy, for example. The first conductor layer 15 may also include an inorganic binder. Examples of the inorganic binder include the same type of ceramic material as the ceramic material included in the ceramic body 10 and a glass component. The content of the inorganic binder in the first conductor layer 15 is preferably in the range of, for example, about 40% by volume to about 60% by volume.

The second conductor layer 16 is arranged so as to cover end portions of the first and second main surfaces 10a and 10b in the length direction L and the first end surface 10e or the second end surface 10f. The second conductor layer 16 covers the first conductor layer 15.

In this preferred embodiment, the second conductor layer 16 preferably includes one plating film or a laminate of a plurality of plating films. The thickness of the second conductor layer 16 is not particularly limited. The maximum thickness of the second conductor layer 16 may preferably range from, for example, about 5 μm to about 15 μm.

The material of the second conductor layer 16 is not particularly limited. The second conductor layer 16 may preferably be made of one metal selected from a group consisting of, for example, Cu, Ni, Sn, Pb, Au, Ag, Pd, Al, Bi, and Zn or may be formed of an alloy including this metal, for example. In particular, when the ceramic electronic component 1 is embedded in a wiring board, the outermost layer of the second conductor layer 16 is preferably made of, for example, one metal selected from a group consisting of Cu, Au, Ag, and Al or made of an alloy including this metal for the following reason. In some cases, the ceramic electronic component 1 may be embedded in a wiring board by irradiating the first and second external electrodes 13 and 14 with laser beams propagating through the wiring board, and the above metals efficiently reflect the laser beams.

An additional layer, such as a conductive resin layer arranged to relax stress, may preferably be provided between the first conductor layer 15 and the second conductor layer 16.

As illustrated in FIGS. 3 and 7, the first outer layer portion 10B includes the plurality of first reinforcement layers 17a. The plurality of first reinforcement layers 17a are arranged in the length direction L and in the width direction W. The plurality of first reinforcement layers 17a are stacked in the thickness direction T. The plurality of first reinforcement layers 17a are not provided in either end portion of the ceramic body 10 in the length direction L. The plurality of first reinforcement layers 17a are successively arranged over a central portion of the ceramic body 10, except at both end portions in the length direction L. The plurality of first reinforcement layers 17a are disposed inside the ceramic body 10, and are not exposed from the surface of the ceramic body 10.

As illustrated in FIG. 3, portions of the plurality of first reinforcement layers 17a, namely, outer end portions in the length direction L, face the first portions 13a and 14a of the first and second external electrodes 13 and 14 in the thickness direction T. That is, the outer end portions of the plurality of first reinforcement layers 17a in the length direction L face the first portions 13a and 14a of the first and second external electrodes 13 and 14 in the thickness direction T.

In this preferred embodiment, the plurality of first reinforcement layers 17a are provided in a first reinforcement region 10F of the ceramic body 10, and the volume proportion of the first reinforcement layers 17a in the first reinforcement region 10F is preferably greater than the volume proportion of the first and second internal electrodes 11 and 12 in the effective portion 10A.

As illustrated in FIG. 3, the second outer layer portion 10C includes the plurality of second reinforcement layers 17b. The plurality of second reinforcement layers 17b are arranged in the length direction L and in the width direction W. The plurality of second reinforcement layers 17b are stacked in the thickness direction T. The plurality of second reinforcement layers 17b are not provided in either end portion of the ceramic body 10 in the length direction L. The plurality of second reinforcement layers 17b are successively arranged over a central portion of the ceramic body 10, except at both end portions in the length direction L. The plurality of second reinforcement layers 17b are disposed inside the ceramic body 10, and are not exposed from the surface of the ceramic body 10. In this preferred embodiment, the first reinforcement layers 17a and the second reinforcement layers 17b have substantially the same shape when viewed in plan.

As illustrated in FIG. 3, portions of the plurality of second reinforcement layers 17b, namely, outer end portions in the length direction L, face the third portions 13c and 14c of the first and second external electrodes 13 and 14 in the thickness direction T. That is, the outer end portions of the plurality of second reinforcement layers 17b in the length direction L face the third portions 13c and 14c of the first and second external electrodes 13 and 14 in the thickness direction T.

In this preferred embodiment, the plurality of second reinforcement layers 17b are provided in a second reinforcement region 10G of the ceramic body 10, and the volume proportion of the second reinforcement layers 17b in the second reinforcement region 10G is preferably greater than the volume proportion of the first and second internal electrodes 11 and 12 in the effective portion 10A.

The first and second reinforcement layers 17a and 17b may be made of any material that is more ductile and malleable than the material of the ceramic body 10. Each of the first and second reinforcement layers 17a and 17b may preferably be made of, for example, a metal such as Ni, Cu, Ag, Pd, or Au or an alloy containing at least one of the above metals, such as an Ag—Pd alloy.

Each of the first and second reinforcement layers 17a and 17b may preferably have a thickness of, for example, about 0.3 μm to about 2.0 μm.

Preferably, the length of the first and second reinforcement layers 17a and 17b in the length direction L, the sum of the length of the first internal electrodes 11 and the length of the first dummy electrodes 18 in the length direction L, and the sum of the length of the second internal electrodes 12 and the length of the second dummy electrodes 19 in the length direction L are equal or substantially equal to one another. In this case, the number of kinds of ceramic green sheets having a conductive paste printed on a surface thereof, which are needed to manufacture the ceramic electronic component 1, is significantly reduced. Accordingly, the ceramic electronic component 1 can be manufactured easily and inexpensively.

In this preferred embodiment, as illustrated in FIG. 3, a thickness T2 of both end portions of the ceramic body 10 in which the first reinforcement layers 17a or the second reinforcement layers 17b are not provided in the length direction is preferably less than a thickness T1 of a portion of the ceramic body 10 in which the first and third portions 13a and 14a and 13c and 14c of the first and second external electrodes 13 and 14 face the first and second reinforcement layers 17a and 17b in the thickness direction T. Thus, as illustrated in detail in FIG. 4, in a portion of the first main surface 10a of the ceramic body 10 in which the first portion 13a or 14a of the first external electrode 13 or the second external electrode 14 is provided, an end portion 10a1 or 10a2 that does not overlap the first reinforcement layers 17a in the length direction L is preferably closer to the center in the thickness direction T than a portion that overlaps the first reinforcement layers 17a. Further, in a portion of the second main surface 10b of the ceramic body 10 in which the third portion 13c or 14c of the first external electrode 13 or the second external electrode 14 is provided, an end portion 10b1 or 10b2 that does not overlap the second reinforcement layers 17b in the length direction L is preferably closer to the center in the thickness direction T than a portion that overlaps the second reinforcement layers 17b.

Additionally, the outer end portions of the first portions 13a and 14a of the first and second external electrodes and 14 in the length direction L in which the first reinforcement layers 17a are not provided (the end portion near the first end surface 10e or the second end surface 10f) are preferably thicker than other portions. The outer end portions of the third portions 13c and 14c of the first and second external electrodes 13 and 14 in the length direction L in which the second reinforcement layers 17b are not provided (the end portion near the first end surface 10e or the second end surface 10f) are preferably thicker than other portions.

Next, an example of a method for manufacturing the ceramic electronic component 1 according to a preferred embodiment will be described.

Figure 8:
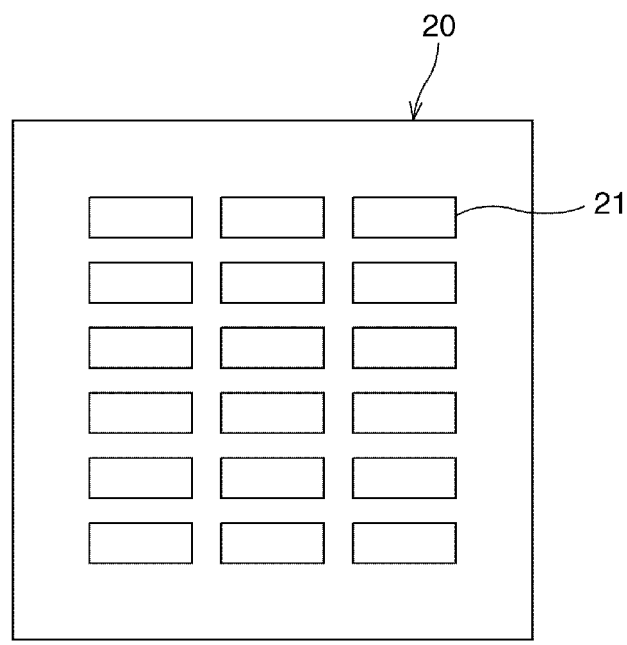
FIG. 8 is a schematic plan view of a ceramic green sheet on which conductor patterns are provided.

First, a ceramic green sheet 20 (see FIG. 8) including a ceramic material for forming the ceramic body 10 is prepared. Then, as illustrated in FIG. 8, a conductive paste is applied onto the ceramic green sheet 20 to form conductor patterns 21. Conductor patterns may be formed using, for example, any printing method, such as a screen printing method. The conductive paste may preferably include conductive particles and any known binder and solvent.

In this preferred embodiment, the length of the first and second reinforcement layers 17a and 17b in the length direction L, the sum of the length of the first internal electrodes 11 and the length of the first dummy electrodes 18 in the length direction L, and the sum of the length of the second internal electrodes 12 and the length of the second dummy electrodes 19 in the length direction L are preferably substantially equal to one another. Thus, a ceramic green sheet for forming the first internal electrodes 11 and the first dummy electrodes 18, a ceramic green sheet 20 for forming the second internal electrodes 12 and the second dummy electrodes 19, a ceramic green sheet 20 for forming the first reinforcement layers 17a, and a ceramic green sheet 20 for forming the second reinforcement layers 17b may have common specifications. That is, only one kind of ceramic green sheet 20 with a conductive paste printed thereon needs to be prepared.

Figure 9:
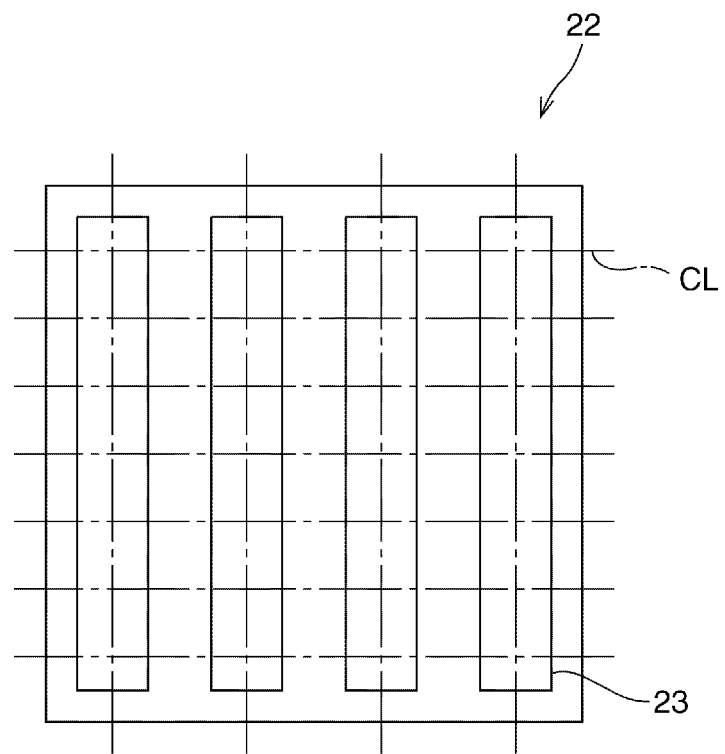
FIG. 9 is a schematic plan view of a mother laminate.
Figure 10:
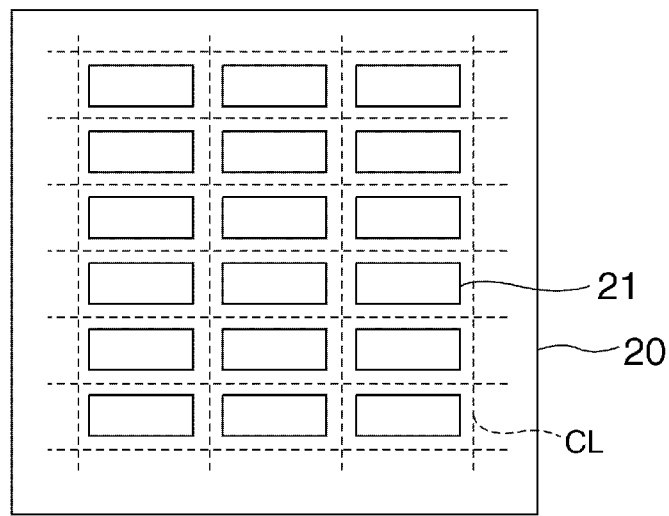
FIG. 10 is a schematic plan view illustrating positions of cutting lines on a ceramic green sheet along which the mother laminate is cut to form first internal electrodes and first dummy electrode.
Figure 11:
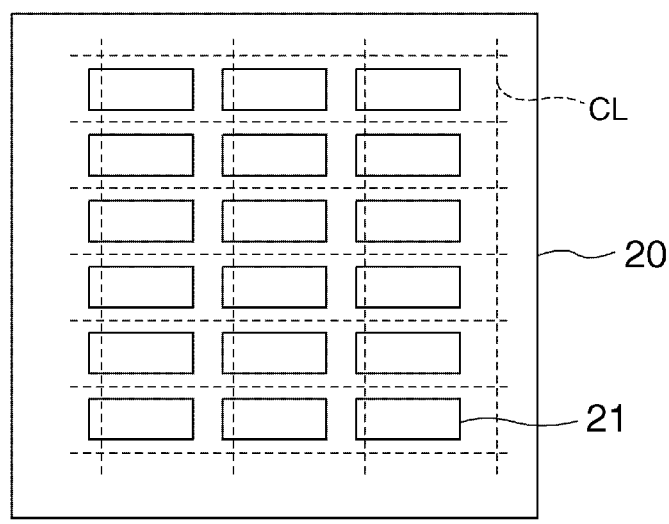
FIG. 11 is a schematic plan view illustrating positions of cutting lines on a ceramic green sheet along which the mother laminate is cut to form second internal electrodes and second dummy electrodes.
Figure 12:
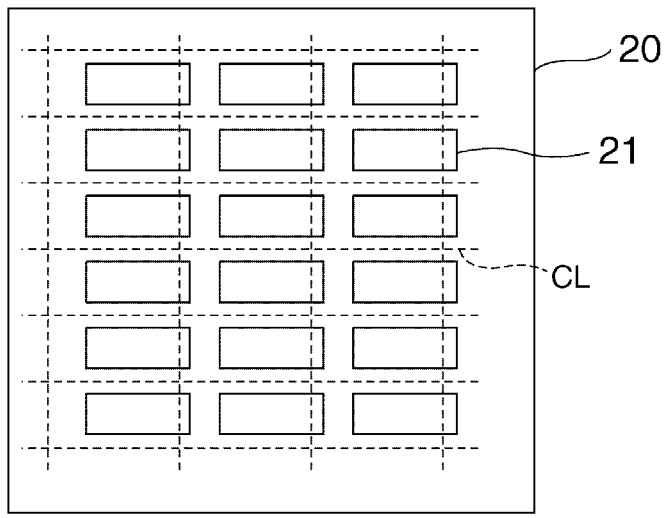
FIG. 12 is a schematic plan view illustrating positions of cutting lines on a ceramic green sheet along which the mother laminate is cut to form reinforcement layers.

Then, as illustrated in FIGS. 10 to 12, a ceramic green sheet 20 on which no conductor patterns 21 are formed, and a ceramic green sheet 20 on which conductor patterns 21 are formed are stacked such that the ceramic green sheets 20 are shifted in the length direction L as desired, and are pressed in the stacking direction by hydrostatic pressure or other suitable pressing device to fabricate a mother laminate 22 illustrated in FIG. 9.

In this preferred embodiment, one ceramic green sheet 20 is located between the adjacent reinforcement layers 17a and 17b. In contrast, a plurality of ceramic green sheets 20 are located between the first and second internal electrodes 11 and 12 adjacent in the thickness direction T.

Then, as illustrated in FIG. 9, conductor patterns 23 having shapes corresponding to the portions forming the first and third portions 13a and 14a and 13c and 14c of the first and second external electrodes 13 and 14 on the first conductor layers 15 are formed on the mother laminate 22 using an appropriate printing method, such as a screen printing method, for example.

Then, the mother laminate 22 is pressed in the stacking direction again. In this case, the mother laminate 22 is pressed so that the thickness of the portions at which the reinforcement layers 17a and 17b and the first and second internal electrodes 11 and 12 do not overlap is reduced, that is, so that, as illustrated in FIG. 3, the thickness T2 is less than the thickness T1. For example, pressing with an elastic body disposed between a press mold and the main surface of the mother laminate 22 allows a portion at which the reinforcement layers 17a and 17b and the first and second internal electrodes 11 and 12 do not overlap to be effectively pressed. Thus, the thickness relationship described above is achieved.

Then, the mother laminate 22 is cut along imaginary cut lines CL to fabricate a plurality of raw ceramic laminates from the mother laminate 22. The mother laminate 22 may be cut by dicing or press-cutting, for example.

After the formation of raw ceramic laminates, the corners and edges of the raw ceramic laminates may be chamfered or R-chamfered and surface layers of the raw ceramic laminates may be polished using barrel polishing, for example.

After that, conductive pastes are applied to both end surfaces of each of the raw ceramic laminates using a suitable method, for example, a dipping method. The applied conductive pastes and the conductor patterns 23 form the conductor layers 15 illustrated in FIG. 3.

If conductive pastes are applied to both end surfaces of a raw ceramic laminate using, for example, a dipping method or other suitable method, the conductive pastes may also be slightly wrapped around the first and second side surfaces and the first and second main surfaces. Thus, a conductive paste layer that forms a first conductor layer 15 in the following firing process is relatively thick in the end portions of the first and second main surfaces 10a and 10b near the first end surface 10e or the second end surface 10f. Accordingly, the outer end portions of the first conductor layer 15 in the length direction L are relatively thick, resulting in the outer end portions of the first and third portions 13a and 14a and 13c and 14c of the first and second external electrodes 13 and 14 in the length direction L being relatively thick. Further, the thickness of the first conductor layer 15 formed on the first end surface 10e or the second end surface 10f can be reduced by, after applying a conductive paste to the first end surface 10e or the second end surface 10f, pressing the first end surface 10e or the second end surface 10f against a surface plate, and removing the excess conductive paste.

Then, the raw ceramic laminates are fired. In this firing process, the conductive paste layer formed in the manner described above is also fired (co-fired), and the conductor layers 15 are formed. The firing temperature can be set as desired in accordance with the type of the ceramic material and conductive paste to be used. The firing temperature may preferably be set to, for example, about 900° C. to about 1300° C.

After that, polishing, such as barrel polishing, for example, is performed as necessary.

Finally, the conductor layers 16 are formed by plating to complete the first and second external electrodes 13 and 14. In preferred embodiments of the present invention, the conductor layers 16 formed of plating films are not essential. For example, the first and second external electrodes 13 and 14 may include only the conductor layers 15.

As described above, in this preferred embodiment, the volume proportion of the first reinforcement layers 17a in the first reinforcement region 10F is preferably greater than the volume proportion of the first and second internal electrodes 11 and 12 in the effective portion 10A. In addition, the volume proportion of the second reinforcement layers 17b in the second reinforcement region 10G is preferably greater than the volume proportion of the first and second internal electrodes 11 and 12 in the effective portion 10A. Therefore, the rigidity of the first and second reinforcement regions 10F and 10G can be effectively increased. Furthermore, the high-rigidity first and second reinforcement regions 10F and 10G effectively reinforce the outer layer portions 10B and 10C, which are susceptible to cracking, breakage, or other damage. Furthermore, even if cracks occur in the first main surface 10a or the second main surface 10b, the cracks do not easily extend to the effective portion 10A located closer to the central portion than the first and second reinforcement regions 10F and 10G. Consequently, high mechanical durability is effectively achieved.

In view of higher mechanical durability, the volume proportion of the first and second reinforcement layers 17a and 17b in the first and second reinforcement regions 10F and 10G is, for example, preferably about 1.5 times or more, and more preferably, about three times or more, the volume proportion of the first and second internal electrodes 11 and 12 in the effective portion 10A. The volume proportion of the first and second reinforcement layers 17a and 17b in the first and second reinforcement regions 10F and 10G is, for example, preferably about five times or less the volume proportion of the first and second internal electrodes 11 and 12 in the effective portion 10A.

The method for making the volume proportion of the first and second reinforcement layers 17a and 17b in the first and second reinforcement regions 10F and 10G greater than the volume proportion of the first and second internal electrodes 11 and 12 in the effective portion 10A is not particularly limited. For example, as in this preferred embodiment, the volume proportion of the first and second reinforcement layers 17a and 17b in the first and second reinforcement regions 10F and 10G may be greater than the volume proportion of the first and second internal electrodes 11 and 12 in the effective portion 10A by making the distance between the first and second reinforcement layers 17a and 17b adjacent in the thickness direction T less than the distance between the first and second internal electrodes 11 and 12 adjacent in the thickness direction T. In this case, preferably, the distance between the first and second reinforcement layers 17a and 17b adjacent in the thickness direction T is, for example, in the range of about 0.125 times to about 0.5 times the distance between the first and second internal electrodes 11 and 12 adjacent in the thickness direction T.

Alternatively, the volume proportion of the first and second reinforcement layers 17a and 17b in the first and second reinforcement regions 10F and 10G may be greater than the volume proportion of the first and second internal electrodes 11 and 12 in the effective portion 10A by making the first reinforcement layer 17a or the second reinforcement layer 17b thicker than the first internal electrode 11 or the second internal electrode 12. In this case, the thickness of the first and second reinforcement layers 17a and 17b is, for example, preferably about 1.3 times or more, and more preferably about twice or more, the thickness of the first internal electrode 11 or the second internal electrode 12. However, if the first and second reinforcement layers 17a and 17b are too thick, the ceramic layers 10g may be easily separated from the first and second reinforcement layers 17a and 17b. Therefore, preferably, the thickness of the first reinforcement layers 17a or the second reinforcement layers 17b is, for example, about four times or less the thickness of the first internal electrode 11 or the second internal electrode 12.

The volume proportion of the first and second reinforcement layers 17a and 17b in the first and second reinforcement regions 10F and 10G may also be made greater than the volume proportion of the first and second internal electrodes 11 and 12 in the effective portion 10A by making the distance between the first and second reinforcement layers 17a and 17b adjacent in the thickness direction T less than the distance between the first and second internal electrodes 11 and 12 adjacent in the thickness direction T and by making the first reinforcement layers 17a or the second reinforcement layers 17b thicker than the first internal electrode 11 or the second internal electrode 12.

Furthermore, in this preferred embodiment, each of the number of first reinforcement layers 17a and the number of second reinforcement layers 17b is preferably greater than the total number of first and second internal electrodes 11 and 12. Therefore, the mechanical durability of the ceramic electronic component 1 is further increased. Each of the number of first reinforcement layers 17a and the number of second reinforcement layers 17b is preferably about 1.5 times or more, and more preferably about twice or more, the total number of first and second internal electrodes 11 and 12, for example. However, too many first reinforcement layers 17a and too many second reinforcement layers 17b can excessively increase the thickness of the ceramic electronic component 1. Therefore, preferably, each of the number of first reinforcement layers 17a and the number of second reinforcement layers 17b is, for example, about five times or less the total number of first and second internal electrodes 11 and 12.

It is assumed that the comparison between volume proportions does not take into account margin portions in the first and second reinforcement regions 10F and 10G that are adjacent in the length direction L and in the width direction W (portions that do not overlap the first and second reinforcement layers 17a and 17b in the thickness direction). It is also assumed that the comparison between volume proportions does not take into account margin portions in the effective portion 10A that are adjacent in the length direction L and in the width direction W (portions that do not overlap the first and second internal electrodes 11 and 12 in the thickness direction).

Furthermore, as in this preferred embodiment, when the width dimension of the first and second reinforcement layers 17a and 17b is substantially the same as the width dimension of the first and second internal electrodes 11 and 12, only the length dimension and the thickness dimension of the first and second reinforcement regions 10F and 10G and the effective portion 10A may be taken into account. In addition, as in this preferred embodiment, when the length dimension of the first and second reinforcement regions 10F and 10G is greater than that of the effective portion 10A, the volume proportion of the first and second reinforcement regions 10F and 10G is greater than the volume proportion of the effective portion 10A if the thickness dimension of the first and second reinforcement regions 10F and 10G is greater than the thickness dimension of the effective portion 10A.

Therefore, in some cases, all the three-dimensional dimensions may not necessarily be taken into account but only the thickness dimension may be taken into account. The thickness dimension of the first and second reinforcement regions 10F and 10G can be determined by (the thickness of the first and second reinforcement layers 17a and 17b)×(the number of first reinforcement layers 17a and the number of second reinforcement layers 17b)+(the thickness of the ceramic layer 10g)×(the number of ceramic layers 10g). The thickness dimension of the effective portion A can be determined by (the thickness of the first and second internal electrodes 11 and 12)×(the number of first internal electrodes 11 and the number of second internal electrodes 12)+(the thickness of the ceramic layer 10g)×(the number of ceramic layers 10g). In the above calculation formulae, the thickness dimension of each element is preferably the value obtained by measuring six desired portions, i.e., the upper end and the lower end of each of the left end, the center, and the right end of each region in the length direction, and by determining the average value of the measured values.

The length dimension and the width dimension are also preferably the values obtained by measuring six desired portions and by determining the average value of the measured values.

In this preferred embodiment, in the portion of the first main surface 10a of the ceramic body 10 in which the first portion 13a or 14a of the first external electrode 13 or the second external electrode 14 is provided, the end portion 10a1 or 10a2 that does not overlap the first reinforcement layers 17a in the length direction L is preferably closer to the center in the thickness direction T than the portion that overlaps the first reinforcement layers 17a. Therefore, for example, if stress is applied from outside in cases such as when the ceramic electronic component 1 is mounted on a wiring board with the first main surface 10a directed toward the wiring board, the ceramic electronic component 1 can be effectively prevented from being damaged. Thus, the mechanical durability of the ceramic electronic component 1 is improved. This advantage will be described in detail hereinafter.

In the ceramic electronic component 1, the first and second external electrodes 13 and 14 are provided on the first and second main surfaces 10a and 10b. Thus, both end portions of the ceramic electronic component 1 in the length direction L project in the thickness direction T. Therefore, both end portions of the ceramic electronic component 1 in the length direction L are susceptible to stress. The stress applied to both end portions of the ceramic electronic component 1 in the length direction L produces stress concentration in portions 10D and 10E (see FIG. 3) in which the leading ends of the first and third portions 13a and 14a and 13c and 14c are located and in which the thickness of the ceramic electronic component 1 greatly changes, and the portions 10D and 10E are susceptible to cracks.

Here, for example, if both end portions of the ceramic electronic component 1 are the thickest, the distance between end portions of the ceramic electronic component 1 that define fulcra and the portions 10D and 10E that define points of action is large, which results in large stress being applied to the portions 10D and 10E.

In contrast, in this preferred embodiment, in the portion of the first main surface 10a of the ceramic body 10 in which the first portion 13a or 14a of the first external electrode 13 or the second external electrode 14 is provided, the end portion 10a1 or 10a2 that does not overlap the first reinforcement layers 17a in the length direction L is preferably closer to the center in the thickness direction T than the portion that overlaps the first reinforcement layers 17a. Therefore, the most projecting portions of the ceramic electronic component 1 in the thickness direction T are closer to the center than end portions. Consequently, the distance between the portions 10D and 10E defining points of action and the fulcra is reduced. The reduction in distance prevents large stress from being exerted on the portions 10D and 10E, and prevents the portions 10D and 10E in the ceramic body 10 from being damaged. Therefore, increased mechanical durability is achieved.

Furthermore, in this preferred embodiment, the portions 10D and 10E, which may be easily damaged, include the first and second reinforcement layers 17a and 17b. Thus, the mechanical strength of the portions 10D and 10E is effectively improved.

In this preferred embodiment, the first and second reinforcement layers 17a and 17b are successively arranged over the central portion of the ceramic body 10, except at both end portions in the length direction L. Thus, the mechanical strength of the central portion of the portions ceramic body 10 in the length direction L, which may also be easily damaged in addition to the portions 10D and 10E, is also effectively increased.

In this preferred embodiment, the thickness T2 of both end portions of the ceramic body 10 in the length direction at which the first reinforcement layers 17a or the second reinforcement layers 17b are not provided is preferably less than the thickness T1 of the portion of the ceramic body 10 in which the first and third portions 13a and 14a and 13c and 14c of the first and second external electrodes 13 and 14 face the first and second reinforcement layers 17a and 17b in the thickness direction T. Further, the portions of the first and third portions 13a and 14a and 13c and 14c of the first and second external electrodes 13 and 14, which are provided on the portion at which the thickness T2 is less than the thickness T1, are relatively thick. Thus, the surfaces of the first and third portions 13a and 14a and 13c and 14c of the first and second external electrodes 13 and 14 are substantially flat. The substantially flat surfaces allow stress to be applied to the entire first and third portions 13a and 14a and 13c and 14c without causing stress concentration to a portion thereof. Thus, large stress is effectively prevented from being applied to a portion of the first and third portions 13a and 14a and 13c and 14c. Therefore, increased mechanical durability is achieved.

When the number of internal electrodes 11 and 12 is relatively large, the effect of the internal electrodes 11 and 12 on improving mechanical strength is large, and the thickness of the ceramic body 10 is also large, which results in an increase in the mechanical strength of the ceramic electronic component 1. In contrast, when the number of internal electrodes 11 and 12 is relatively small, for example, about 2 to about 20, the effect of the internal electrodes 11 and 12 on improving mechanical strength is relatively small, and the ceramic body 10 is thin, which results in the mechanical strength problem with the ceramic electronic component 1 being noticeable. Therefore, as in this preferred embodiment, the technology to improve the mechanical durability of the ceramic electronic component 1 by providing the reinforcement layers 17a and 17b and by lowering the end portions of the first main surface 10a in the length direction L so that the end portions are close to the center in the thickness direction T is effective particularly when the number of layers of the internal electrodes 11 and 12 is small, for example, about 2 to about 20.

Other examples of preferred embodiments of the present invention will be described hereinafter. In the following description, members having functions substantially the same as those in the first preferred embodiment are represented by common numerals and descriptions thereof are omitted.

Second Preferred Embodiment

Figure 13:
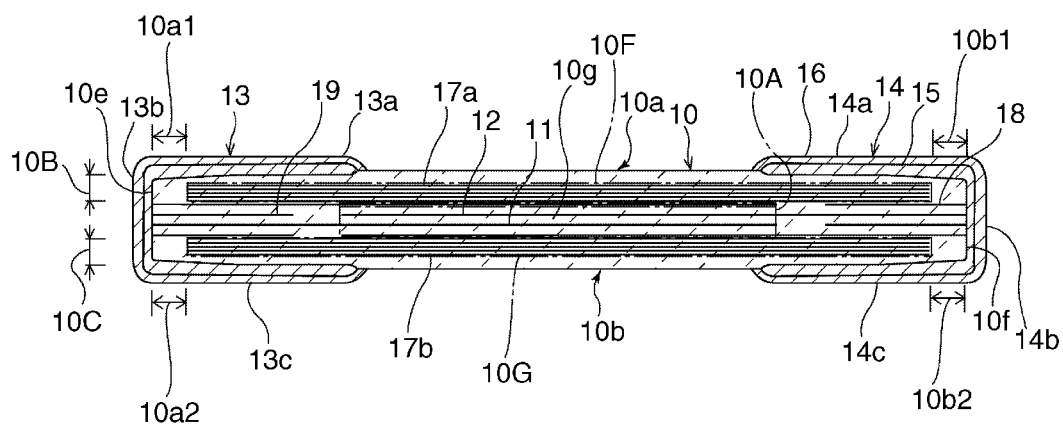
FIG. 13 is a schematic cross-sectional view of a ceramic electronic component according to a second preferred embodiment of the present invention.

FIG. 13 is a schematic cross-sectional view of a ceramic electronic component according to a second preferred embodiment of the present invention.

In this preferred embodiment, as illustrated in FIG. 13, at least a portion of the first and third portions 13a and 14a and 13c and 14c of the first and second external electrodes 13 and 14 is preferably embedded in the first main surface 10a or the second main surface 10b. Even in this case, similarly to the first preferred embodiment, the mechanical durability of the ceramic electronic component 1 is effectively improved.

The ceramic electronic component according to this preferred embodiment may preferably be formed by, for example, printing, on the main surfaces of a mother laminate, conductor patterns 23 having shapes corresponding to the portions forming the first and third portion 13a and 14a and 13c and 14c and then by pressing the mother laminate in the stacking direction such that the mother laminate is pressed with stronger force. Therefore, the embedded portions as described above can be formed.

Third Preferred Embodiment

Figure 14:
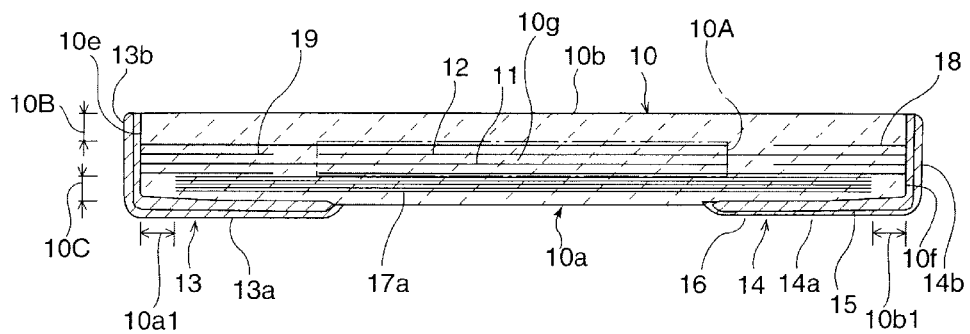
FIG. 14 is a schematic cross-sectional view of a ceramic electronic component according to a third preferred embodiment of the present invention.

FIG. 14 is a schematic cross-sectional view of a ceramic electronic component according to a third preferred embodiment of the present invention.

In the first preferred embodiment, the first and second external electrodes 13 and 14 are provided on each of the first and second main surfaces 10a and 10b, by way of example. However, preferred embodiments of the present invention are not limited to this configuration. At least one external electrode may be provided on the first main surface 10a.

For example, as illustrated in FIG. 14, the first and second external electrodes 13 and 14 may be arranged so as to cover the first end surface 10e or the second end surface 10f and the first main surface 10a. That is, as long as the first and second external electrodes 13 and 14 include the first portions 13a and 14a, respectively, and are electrically connected to the first internal electrode 11 or the second internal electrode 12, the shapes of the first and second external electrodes 13 and 14 are not particularly limited.

Also in this preferred embodiment, the second reinforcement layers 17b may preferably be provided in addition to the first reinforcement layers 17a. However, since the ceramic electronic component 1 often suffers damage from the impact caused when mounted, the mechanical durability of the ceramic electronic component 1 may be effectively improved by providing only the first reinforcement layers 17a on the side at which the first portions 13a and 14a are provided. Furthermore, the thickness of the ceramic electronic component 1 may be further reduced by not providing the third portion 13c or 14c or the second reinforcement layers 17b.

Fourth Preferred Embodiment

Figure 15:
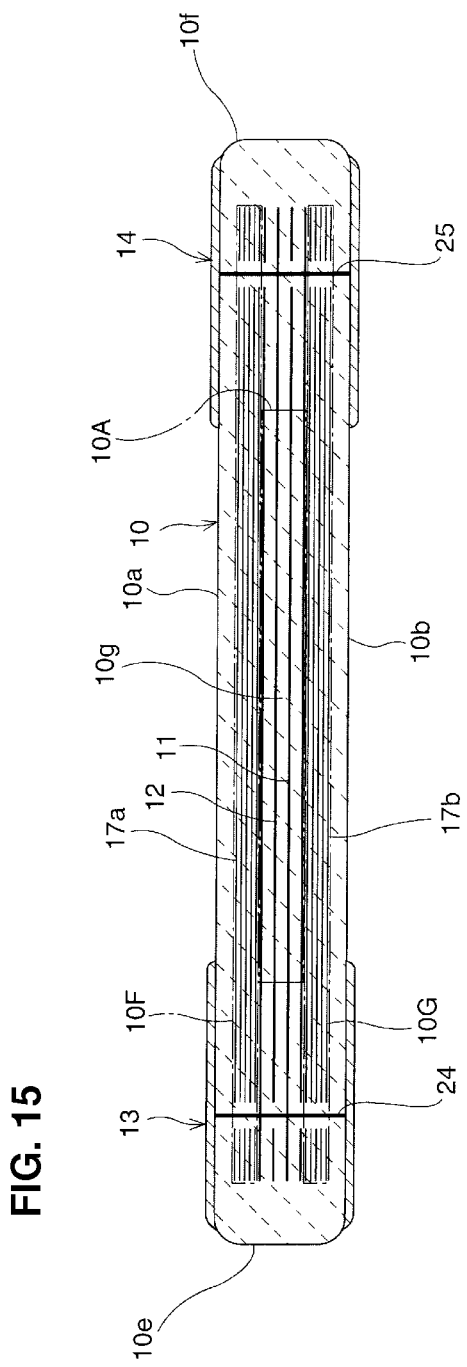
FIG. 15 is a schematic cross-sectional view of a ceramic electronic component according to a fourth preferred embodiment of the present invention.

FIG. 15 is a schematic cross-sectional view of a ceramic electronic component according to a fourth preferred embodiment of the present invention.

In the first preferred embodiment, the first and second internal electrodes 11 and 12 are electrically connected to the first external electrode 13 or the second external electrode 14 by extending the first and second internal electrodes 11 and 12 to the first end surface 10e or the second end surface 10f and by providing the first external electrode 13 or the second external electrode 14 on the first and second end surfaces 10e and 10f, by way of example. However, preferred embodiments of the present invention are not limited to this configuration.

For example, as illustrated in FIG. 15, via-hole electrodes 24 and 25 may preferably be provided, and the first and second internal electrodes 11 and 12 may extend to the first and second main surfaces 10a and 10b so as to be electrically connected to the first and second external electrodes 13 and 14 on the first and second main surfaces 10a and 10b. In this case, the first and second external electrodes 13 and 14 may preferably be provided on at least one of the first and second main surfaces 10a and 10b, and the first and second external electrodes 13 and 14 may not necessarily be provided on the first and second side surfaces 10c and 10d and on the first and second end surfaces 10e and 10f.

Fifth Preferred Embodiment

Figure 16:
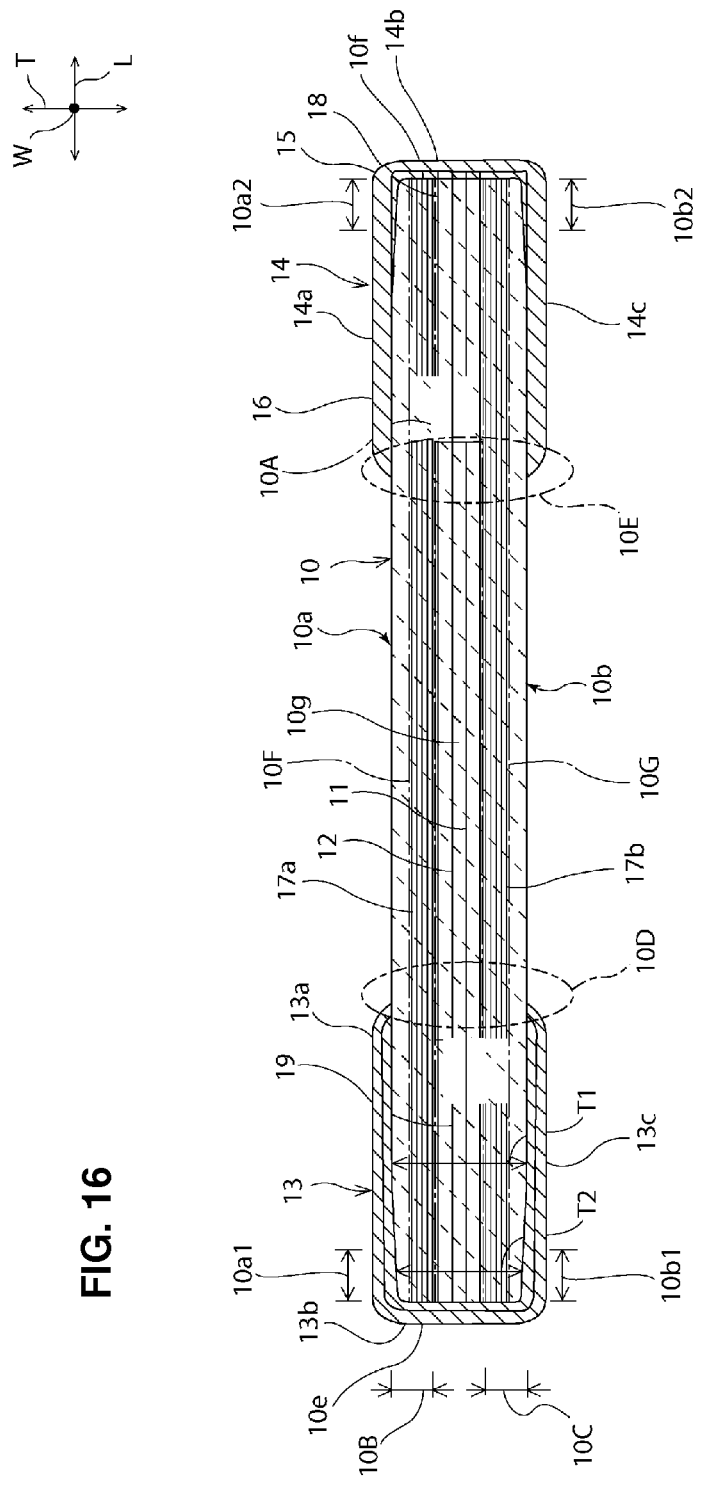
FIG. 16 is a schematic cross-sectional view of a ceramic electronic component according to a fifth preferred embodiment of the present invention.

FIG. 16 is a schematic cross-sectional view of a ceramic electronic component according to a fifth preferred embodiment of the present invention. As illustrated in FIG. 16, in the ceramic electronic component according to the fifth preferred embodiment, a plurality of first reinforcement layers 17a that are arranged so as to extend in the length direction L and in the width direction W and that are stacked in the thickness direction T are preferably provided in the first outer layer portion 10B. Further, a plurality of second reinforcement layers 17b that are arranged so as to extend in the length direction L and in the width direction W and that are stacked in the thickness direction T are preferably provided in the second outer layer portion 10C. The volume proportion of the plurality of first reinforcement layers 17a in a region of the ceramic body 10 in which the plurality of first reinforcement layers 17a are provided is preferably greater than the volume proportion of the first and second internal electrodes 11 and 12 in the effective portion 10A. The volume proportion of the plurality of second reinforcement layers 17b in a region of the ceramic body 10 in which the plurality of second reinforcement layers 17b are provided is preferably greater than the volume proportion of the first and second internal electrodes 11 and 12 in the effective portion 10A. Each of the number of first reinforcement layers 17a and the number of second reinforcement layers 17b is preferably greater than the total number of first and second internal electrodes 11 and 12. Therefore, in this preferred embodiment, similarly to the first preferred embodiment, high mechanical durability is achieved.

In addition, similarly to the first preferred embodiment, the first and second reinforcement layers 17a and 17b are arranged so as to extend in an area from a region in which the first and third portions 13a and 13c of the first external electrode 13 are provided to a region in which the first and third portions 14a and 14c of the second external electrode 14, including the central portion in the length direction L. Therefore, increased mechanical durability is achieved.

In this preferred embodiment, each of the plurality of reinforcement layers 17a and each of the plurality of reinforcement layers 17b are separated into a plurality of reinforcement layer pieces in the length direction L in regions that are regions outside of the effective portion 10A and that are regions in which the first and third portions 13a and 14a and 13c and 14c are provided in the length direction L. Thus, one reinforcement layer portion of each of the reinforcement layers 17a, which is separated into a plurality of reinforcement layer pieces, and one reinforcement layer piece of each of the reinforcement layers 17b, which is separated into a plurality of reinforcement layer pieces, preferably include the central portion of the ceramic body 10 in the length direction L, and are arranged so as to extend over the portions 10D and 10E. The above configuration prevents, similarly to the first preferred embodiment, large stress from being exerted on the portions 10D and 10E, and prevents the portions 10D and 10E in the ceramic body 10 from being damaged. Consequently, increased mechanical durability is achieved.

It is noted that a reinforcement layer separated into a plurality of reinforcement layer pieces in the length direction L is also referred to as one reinforcement layer.

Sixth Preferred Embodiment

Figure 17:
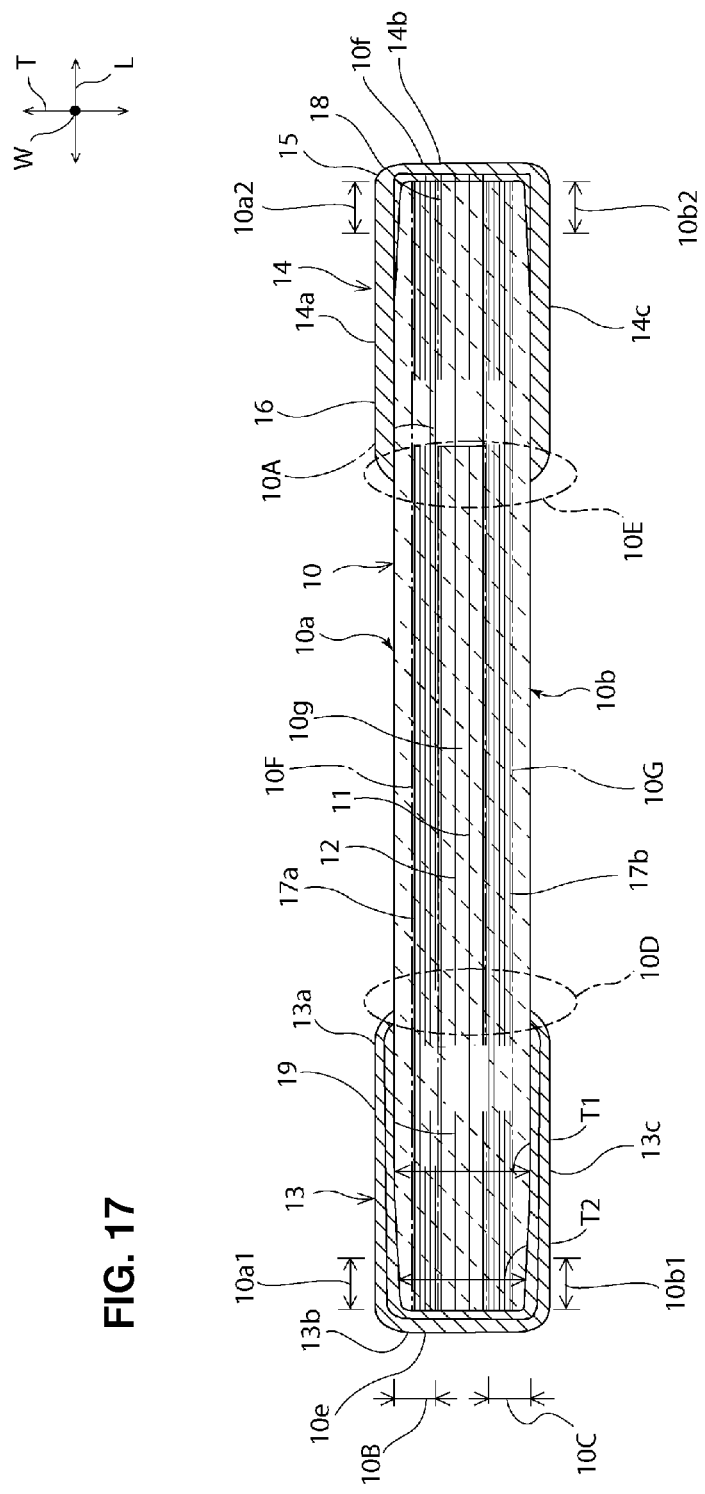
FIG. 17 is a schematic cross-sectional view of a ceramic electronic component according to a sixth preferred embodiment of the present invention.

FIG. 17 is a schematic cross-sectional view of a ceramic electronic component according to a sixth preferred embodiment of the present invention. As illustrated in FIG. 17, in the ceramic electronic component according to the sixth preferred embodiment, a plurality of first reinforcement layers 17a that are arranged so as to extend in the length direction L and in the width direction W and that are stacked in the thickness direction T are preferably provided in the first outer layer portion 10B. Further, a plurality of second reinforcement layers 17b that are arranged so as to extend in the length direction L and in the width direction W and that are stacked in the thickness direction T are preferably provided in the second outer layer portion 10C. The volume proportion of the plurality of first reinforcement layers 17a in the region of the ceramic body 10 in which the plurality of first reinforcement layers 17a are provided is preferably greater than the volume proportion of the first and second internal electrodes 11 and 12 in the effective portion 10A. The volume proportion of the plurality of second reinforcement layers 17b in the region of the ceramic body 10 in which the plurality of second reinforcement layers 17b are provided is preferably greater than the volume proportion of the first and second internal electrodes 11 and 12 in the effective portion 10A. Each of the number of first reinforcement layers 17a and the number of second reinforcement layer 17b is preferably greater than the total number of first and second internal electrodes 11 and 12. Therefore, in this preferred embodiment, similarly to the first preferred embodiment, high mechanical durability is achieved.

In addition, similarly to the first preferred embodiment, the first and second reinforcement layers 17a and 17b are arranged so as to extend in an area from a region in which the first and third portions 13a and 13c of the first external electrode 13 are provided to a region in which the first and third portions 14a and 14c of the second external electrode are provided, including the central portion in the length direction L. Therefore, increased mechanical durability is achieved.

In this preferred embodiment, some of the plurality of reinforcement layers 17a and some of the plurality of reinforcement layers 17b are preferably separated into a plurality of reinforcement layer pieces in the length direction L in regions that are regions outside of the effective portion 10A and that are regions in which the first and third portions 13a and 14a and 13c and 14c are provided in the length direction L. Thus, the reinforcement layers 17a and 17b that are not separated into a plurality of reinforcement layer pieces include the central portion of the ceramic body 10 in the length direction L, and are provided so as to extend over the portions 10D and 10E. Also, one reinforcement layer piece of each of the reinforcement layers 17a that is separated into a plurality of reinforcement layer pieces and one reinforcement layer piece of each of the reinforcement layers 17b that is separated into a plurality of reinforcement layer pieces include the central portion of the ceramic body 10 in the length direction L, and are arranged so as to extend over the portions 10D and 10E. The above configuration prevents, similarly to the first preferred embodiment, large stress from being exerted on the portions 10D and 10E, and prevents the portions 10D and 10E in the ceramic body 10 from being damaged. Consequently, increased mechanical durability is achieved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
a ceramic body having a substantially rectangular parallelepiped shape having a first main surface, a second main surface, a first side surface, a second side surface, a first end surface, and a second end surface, the first main surface and the second main surface extending in a length direction of the ceramic body and in a width direction of the ceramic body, the first side surface and the second side surface extending in the length direction and in a thickness direction of the ceramic body, the first end surface and the second end surface extending in the width direction and in the thickness direction;
a first internal electrode and a second internal electrode provided inside the ceramic body, the first internal electrode and the second internal electrode extending in the length direction and in the width direction and facing each other in the thickness direction;
a first external electrode provided on the first end surface of the ceramic body and including a portion extending onto the first main surface of the ceramic body, the first external electrode being electrically connected to the first internal electrode; and
a second external electrode provided on the second end surface of the ceramic body and including a portion extending onto the first main surface of the ceramic body, the second external electrode being electrically connected to the second internal electrode; wherein
the ceramic body includes an effective portion in which the first internal electrode and the second internal electrode face each other in the thickness direction, a first outer layer portion that is located closer to the first main surface than the effective portion, and a second outer layer portion that is located closer to the second main surface than the effective portion is;
a plurality of first reinforcement layers are provided in the first outer layer portion so as to extend in the length direction and in the width direction, the plurality of first reinforcement layers being stacked in the thickness direction;
each of the plurality of first reinforcement layers includes a first end portion that faces the portion of the first external electrode extending onto the first main surface of the ceramic body in the thickness direction and a second end portion that faces the portion of the second external electrode extending onto the first main surface of the ceramic body in the thickness direction; and
a volume proportion of the plurality of first reinforcement layers in a region of the ceramic body in which the plurality of first reinforcement layers are provided is greater than a volume proportion of the first internal electrode and the second internal electrode in the effective portion.

2. The ceramic electronic component according to claim 1, wherein a number of the first reinforcement layers is greater than a total number of first and second internal electrodes.

3. The ceramic electronic component according to claim 1, wherein a distance between first reinforcement layers that are adjacent in the thickness direction among the plurality of first reinforcement layers is less than a distance between the first internal electrode and the second internal electrode that are adjacent in the thickness direction.

4. The ceramic electronic component according to claim 1, wherein each of the plurality of first reinforcement layers has a thickness greater than the first internal electrode or the second internal electrode.

5. The ceramic electronic component according to claim 1, wherein each of the plurality of first reinforcement layers is made of a metal or an alloy.

6. The ceramic electronic component according to claim 1, further comprising a plurality of second reinforcement layers arranged in the second outer layer portion so as to extend in the length direction and in the width direction, the plurality of second reinforcement layers being stacked in the thickness direction; wherein
a volume proportion of the plurality of second reinforcement layers in a region of the ceramic body in which the plurality of second reinforcement layers are provided is greater than a volume proportion of the first internal electrode and the second internal electrode in the effective portion.

7. A ceramic electronic component comprising:
a ceramic body having a rectangular parallelepiped shape including a first main surface, a second main surface, a first side surface, a second side surface, a first end surface, and a second end surface, the first main surface and the second main surface extending in a length direction of the ceramic body and in a width direction of the ceramic body, the first side surface and the second side surface extending in the length direction and in a thickness direction of the ceramic body, the first end surface and the second end surface extending in the width direction and in the thickness direction;
a first internal electrode and a second internal electrode provided inside the ceramic body, the first internal electrode and the second internal electrode extending in the length direction and in the width direction and facing each other in the thickness direction;
a first external electrode provided on the first end surface of the ceramic body and including a portion extending onto the first main surface of the ceramic body, the first external electrode being electrically connected to the first internal electrode; and
a second external electrode provided on the second end surface of the ceramic body and including a portion extending onto the first main surface of the ceramic body, the second external electrode being electrically connected to the second internal electrode; wherein
the ceramic body includes an effective portion in which the first internal electrode and the second internal electrode face each other in the thickness direction, a first outer layer portion that is located closer to the first main surface than the effective portion, and a second outer layer portion that is located closer to the second main surface than the effective portion;
a plurality of first reinforcement layers are provided in the first outer layer portion so as to extend in the length direction and in the width direction, the plurality of first reinforcement layers being stacked in the thickness direction;
each of the plurality of first reinforcement layers includes a first end portion that faces the portion of the first external electrode extending onto the first main surface of the ceramic body in the thickness direction and a second end portion that faces the portion of the second external electrode extending onto on the first main surface of the ceramic body in the thickness direction; and
a total number of the first reinforcement layers is greater than a total number of first and second internal electrodes.

8. The ceramic electronic component according to claim 7, wherein a distance between first reinforcement layers that are adjacent in the thickness direction among the plurality of first reinforcement layers is less than a distance between the first internal electrode and the second internal electrode that are adjacent in the thickness direction.

9. The ceramic electronic component according to claim 7, wherein each of the plurality of first reinforcement layers has a thickness that is greater than the first internal electrode or the second internal electrode.

10. The ceramic electronic component according to claim 7, wherein each of the plurality of first reinforcement layers is made of a metal or an alloy.

11. The ceramic electronic component according to claim 7, further comprising a plurality of second reinforcement layers arranged in the second outer layer portion so as to extend in the length direction and in the width direction, the plurality of second reinforcement layers being stacked in the thickness direction; wherein
a number of the second reinforcement layers is greater than a total number of first and second internal electrodes.

* * * * *